E. E. McCARGAR.
GRIDDLE.
APPLICATION FILED JAN. 31, 1921.
1,410,818.  Patented Mar. 28, 1922.
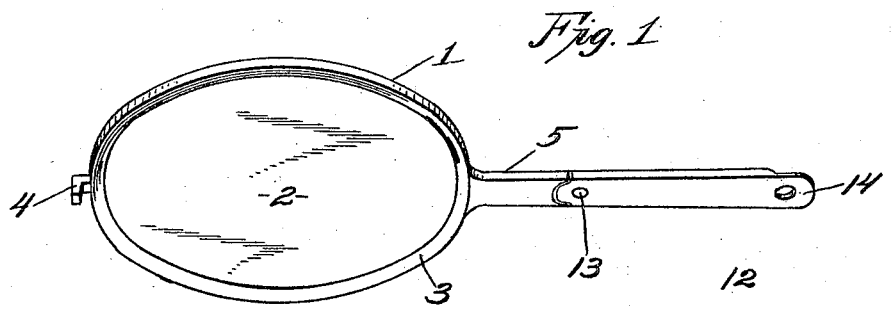
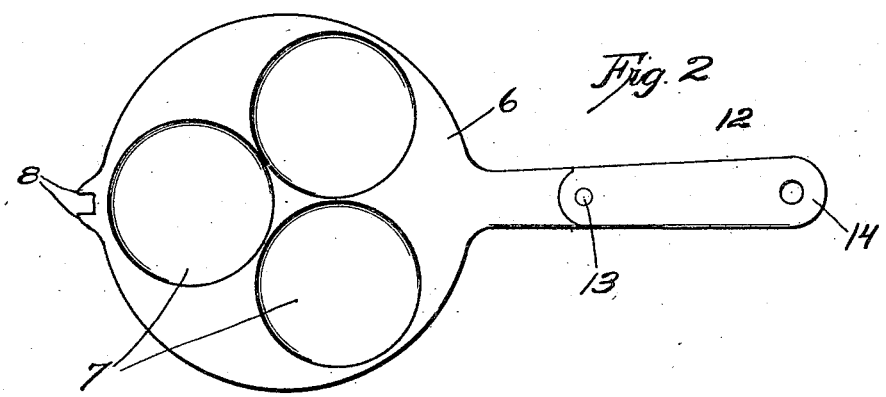
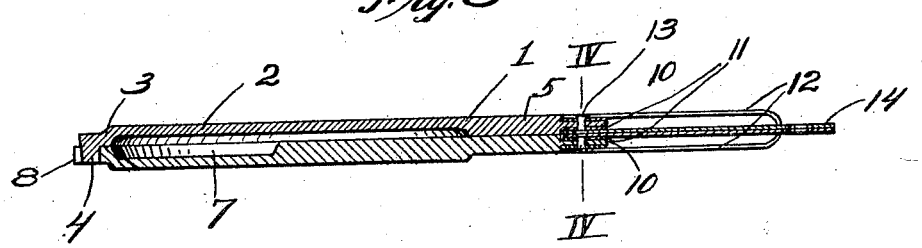
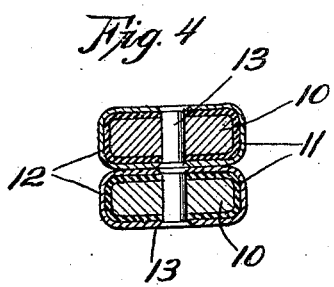
Witness:
R. E. Hamilton
Inventor:
Elmer E. McCargar,
By
Thorpe & Gerard,
Attorneys.

UNITED STATES PATENT OFFICE.

ELMER E. McCARGAR, OF ST. JOSEPH, MISSOURI, ASSIGNOR OF ONE-HALF TO JOHN A. GAY, OF ST. JOSEPH, MISSOURI.

GRIDDLE.

1,410,818.   Specification of Letters Patent.   Patented Mar. 28, 1922.

Application filed January 31, 1921. Serial No. 441,173.

*To all whom it may concern:*

Be it known that I, ELMER E. MCCARGAR, a citizen of the United States, and resident of St. Joseph, county of Buchanan, State of Missouri, have invented a certain new and useful Improvement in Griddles, of which the following is a complete specification.

This invention relates to improvements in griddles for use in cooking pan or griddle cakes and has for its object to produce a utensil of this character which is adapted for use in connection with any source of sufficient heat, such as modern coal or gas ranges, electric heaters or other cooking devices.

Another object is to produce a griddle comprising two members, which are adapted to be used in conjunction with each other during certain stages of the frying operation and later to be detached and used entirely separate.

A still further object is to provide a griddle which may be readily and easily cleaned and is light in weight, but so constructed that heat will be uniformly distributed throughout the griddle in order that the edges of the cakes may be exposed to the necessary heat to properly cook them.

With the objects named in view, the invention consists in certain novel and useful features of construction and organization of parts as hereinafter described and claimed; and in order that it may be fully understood, reference is to be had to the accompanying drawing, in which:

Figure 1 is a perspective view of one of the griddle members.

Figure 2 is a top plan view of the other griddle member.

Figure 3 is a central vertical section through the longitudinal axis of the griddle members when fitted together.

Figure 4 is a section on the line IV—IV of Figure 3, on an enlarged scale.

In the said drawing, where like reference characters identify corresponding parts in all of the figures, 1 represents what may be termed the upper griddle member, which is provided with a thin bottom portion 2 and a circumferential rim portion 3, said rim portion being of greater thickness to aid in holding the heat, and also to act as a rim to prevent the cakes from falling from the griddle when operated as hereinafter described.

At a suitable point in the exterior circumference of the griddle member 1, an L-shaped lug 4 is formed for a purpose hereinafter explained, and at a point diametrically opposite to said lug is a handle portion 5 to which further reference will be made.

Adapted to be used in connection with griddle 1 is a second griddle member 6 of the same diameter as the member 1 and on which said member 1 is adapted to rest, with only its rim portion 3 in contact therewith. The griddle 6 is formed with a series of depressions 7 into which the batter is designed to be poured. At a suitable point in the exterior circumference of the member 6 a pair of ears 8 are formed, said ears being adapted to receive between them the lug 4 of member 1, and at a point diametrically opposite said ears is a handle portion 9, corresponding in all particulars to the handle portion 5 of the member 1.

The ends of the handle portions 5 and 9, respectively, are formed with reduced portions 10 adapted to receive insulating sleeves 11 of any suitable heat-insulating material, such as asbestos. Hollow handle elements 12 of appropriate size are fitted on the reduced handle portions, 5 and 9, and insulating sleeves 11, and held immovably in position by means of rivets 13. The ends of the handles may be formed with flat perforated portions 14 for convenience in hanging the griddles up after use.

It will be understood that the insulating sleeves are for the purpose of protecting the griddle handles from becoming hot during the use of the utensil.

In the use of the device, the two griddle members 1 and 6 are placed over separate burners or parts of the stove, and when sufficiently heated the recesses 7 in the members 6 are supplied with batter. Thus while the cakes are cooking in the member 6, the other griddle member 1 is kept hot, and when the cakes are ready to turn the member 1 is applied to the member 6 with its lug 4 in engagement with the lugs 8 and with the handles 12 abutting each other as shown in Figure 3, thereby maintaining the griddle members in proper register during the turning operation. The central depression within the rim portion 3 of the member 2 also provides a space overlying and connecting all the recesses 7, and adapted to promote a uniform cooking action by facilitating even heating and expansion of the air throughout the whole space between the griddle members and permitting any overflowing of the batter from the recesses. The device is then inverted and the member 1 brought back over its burner and with the cakes deposited on the upper face thereof where the cooking process is completed. The griddle member 6 is restored to its original position and a further supply of batter placed in the recesses 7. By the time the second batch of cakes has been partially cooked in the member 6, the cooking of the first batch has been completed on the griddle member 1 and the first batch of cakes may now be removed and said member 1 reapplied to the griddle member 6, and the process repeated as often as desired. The insulated form of handles of course prevents the handle members 12 from becoming unduly hot. The feature of the griddle members 1 and 6 being made separable so that they may be entirely detached for placing them over separate burners renders it immaterial what the relative positions of the burners may be, thus affording a distinct advantage over a permanently hinged griddle structure which would of course require the two burners being used to be a certain fixed distance apart. The metal forming the bottoms of the recesses 7 being relatively thin enables the cooking recesses or molds to be easily heated while the thickness of the sides of said molds or recesses serves to retain the heat and effect the proper cooking and browning of the edges of the cakes.

From the above it will be apparent that I have devised a simple, practical and efficient device for carrying out the desired objects of the invention, and while I have illustrated and described what I now consider to be the preferred embodiment I reserve the right to make such changes as may fairly fall within the scope of the appended claim:

I claim:

A griddle composed of two separable griddle members having detachably interengaging portions, one of said members having its inner face formed with a plurality of batter-receiving recesses, and the other of said members having on its inner face a marginal rim adapted for engagement with the outer margin of the inner face of said first member, the inner face of said second member having a depression surrounded by said rim and providing a communicating space between said batter-receiving recesses when said members are in superposed relation.

In witness whereof I hereunto affix my signature.

ELMER E. McCARGAR.